(12) United States Patent
Hasegawa

(10) Patent No.: US 12,143,544 B2
(45) Date of Patent: Nov. 12, 2024

(54) INFORMATION PROCESSING SYSTEM AND METHOD FOR CONTROLLING THE SAME

(71) Applicant: CANON KABUSHIKI KAISHA, Tokyo (JP)

(72) Inventor: Kiichi Hasegawa, Ibaraki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/673,659

(22) Filed: Feb. 16, 2022

(65) Prior Publication Data

US 2022/0272211 A1    Aug. 25, 2022

(30) Foreign Application Priority Data

Feb. 22, 2021    (JP) ................ 2021-026676

(51) Int. Cl.
| | |
|---|---|
| *G06F 3/12* | (2006.01) |
| *G06F 8/61* | (2018.01) |
| *G06F 21/31* | (2013.01) |
| *G06F 21/60* | (2013.01) |
| *H04N 1/00* | (2006.01) |

(52) U.S. Cl.
CPC .......... *H04N 1/00212* (2013.01); *G06F 8/61* (2013.01); *G06F 21/31* (2013.01); *G06F 21/608* (2013.01); *H04N 1/00214* (2013.01)

(58) Field of Classification Search
CPC .. H04N 1/00212; H04N 1/00214; G06F 8/61; G06F 21/31; G06F 21/608
See application file for complete search history.

(56) References Cited

U.S. PATENT DOCUMENTS

| | | | |
|---|---|---|---|
| 2012/0182570 A1* | 7/2012 | Robinson ............... | H04L 51/00 358/1.13 |
| 2014/0118780 A1* | 5/2014 | Kimura ................ | G06F 21/604 358/1.15 |
| 2015/0095463 A1* | 4/2015 | Saito ...................... | G06F 3/1231 709/219 |
| 2015/0172505 A1* | 6/2015 | Park ................... | H04N 1/00307 358/1.15 |
| 2016/0210709 A1* | 7/2016 | Uchida ................... | G06F 21/10 |
| 2019/0068595 A1* | 2/2019 | Mochizuki ............ | G06F 21/608 |
| 2020/0099637 A1* | 3/2020 | Kurokawa ........ | H04N 1/00875 |
| 2020/0119920 A1* | 4/2020 | Kohli .................. | H04W 12/069 |
| 2020/0356321 A1* | 11/2020 | Suzuki .................... | G06F 3/126 |

FOREIGN PATENT DOCUMENTS

JP    2018128843 A    8/2018

* cited by examiner

*Primary Examiner* — Huo Long Chen
(74) *Attorney, Agent, or Firm* — Canon U.S.A., Inc. IP Division

(57) ABSTRACT

An information processing system of the present disclosure includes a first authentication unit configured to receive first authentication information input by a user and perform authentication based on the first authentication information, a registration unit configured to register an image processing apparatus based on the authentication, a second transmission unit configured to transmit second authentication information to the image processing apparatus upon registration of the image processing apparatus by the registration unit, and a second authentication unit configured to perform authentication to install a predetermined application in a second information processing apparatus based on the second authentication information.

10 Claims, 16 Drawing Sheets

FIG.11
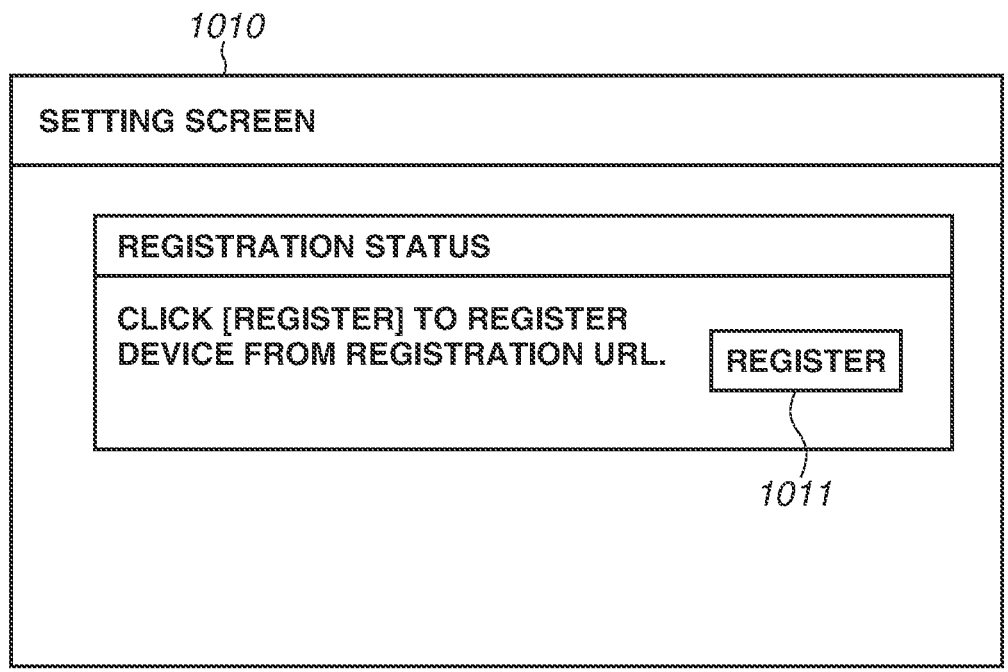
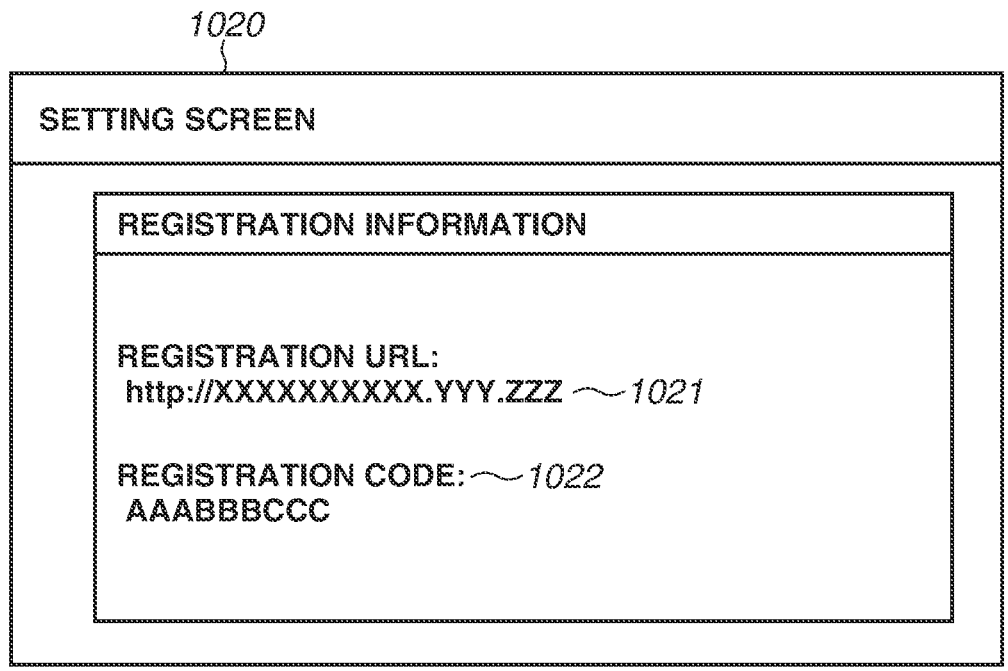

FIG.12
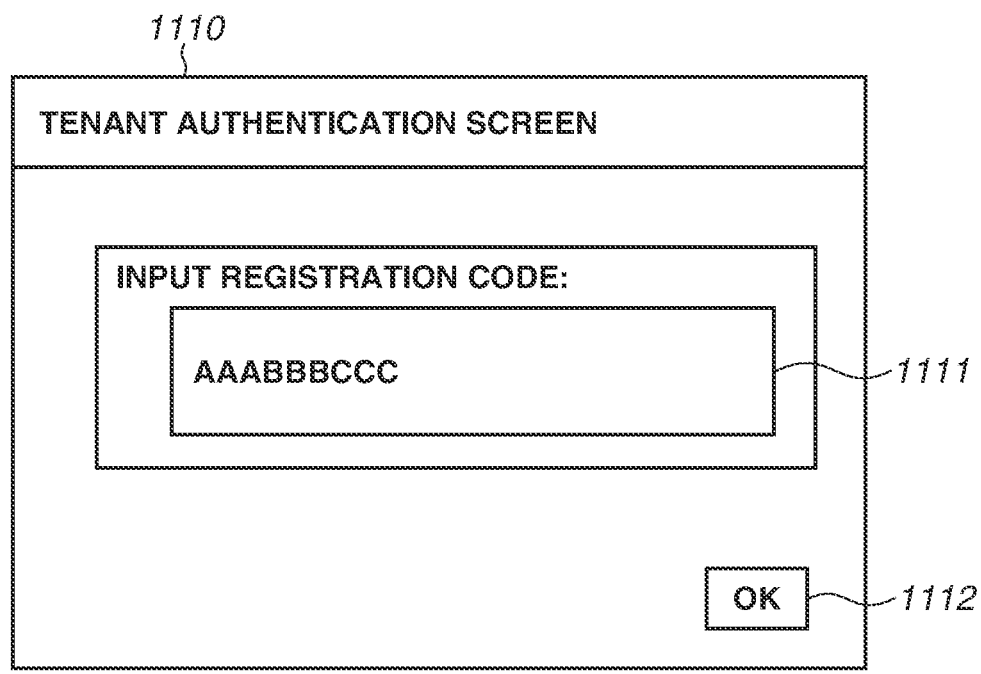
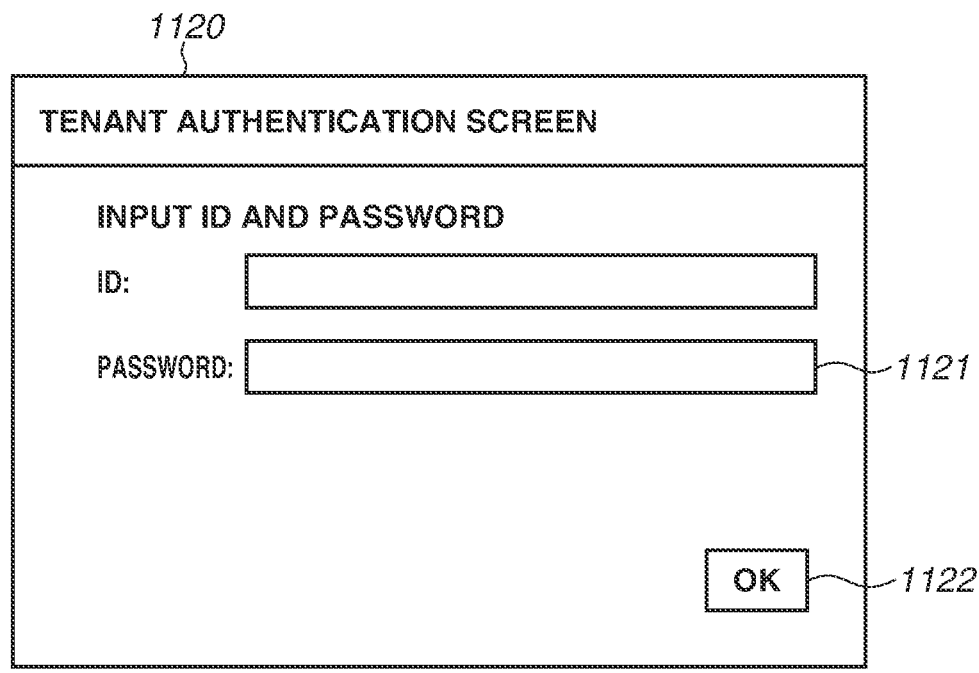

FIG.14
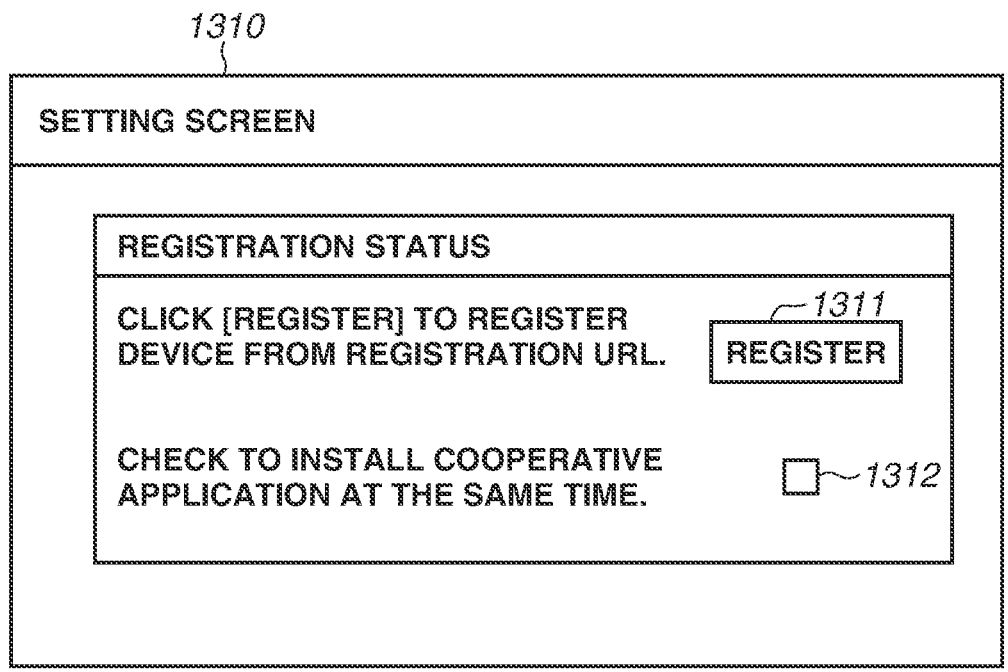
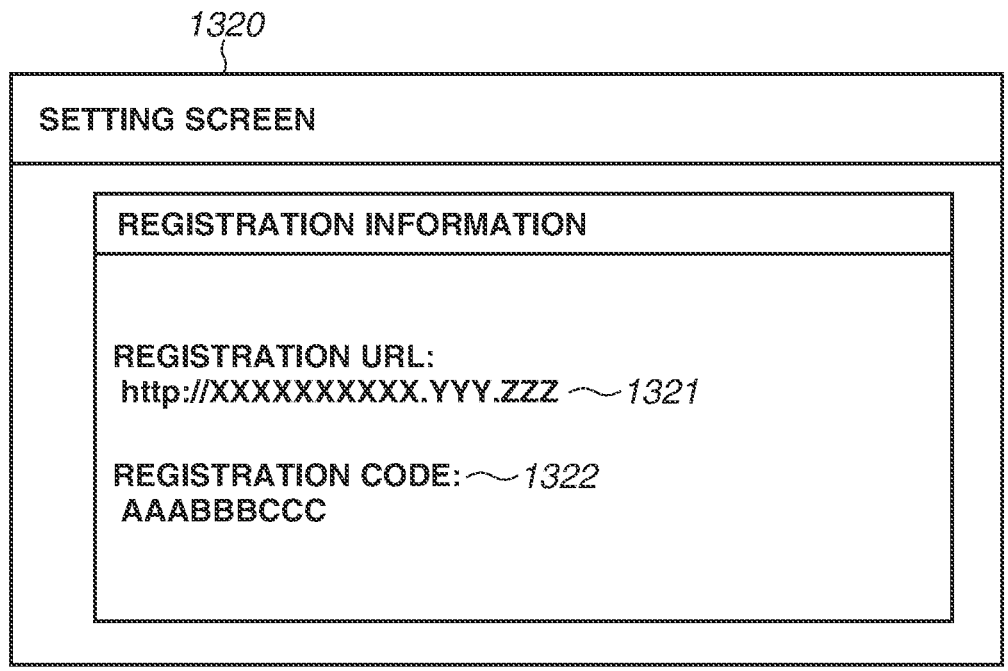

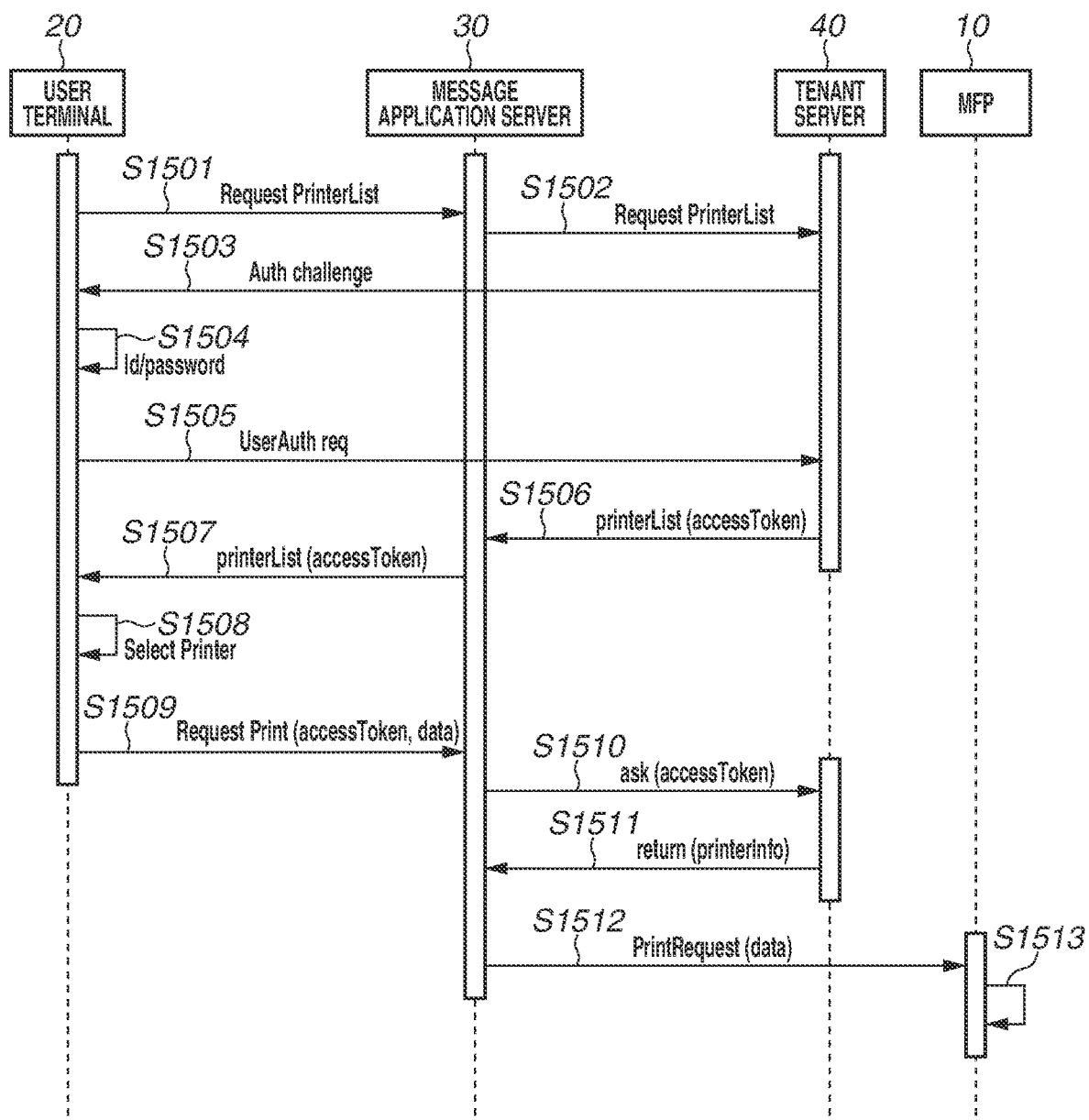

INFORMATION PROCESSING SYSTEM AND METHOD FOR CONTROLLING THE SAME

BACKGROUND

Field of the Disclosure

The present disclosure relates to an information processing system and a method for controlling the same.

Description of the Related Art

Japanese Patent Application Laid-Open No. 2018-128843 discusses a message application service (chat service) in which, when a cooperative application (Bot application) is executed, image data uploaded by the user is transmitted to a printer, and the printer prints the image data.

To transmit the image data uploaded to the message application service by the user to the printer, as discussed in Japanese Patent Application Laid-Open No. 2018-128843, it is necessary to install the cooperative application in a message application server that provides the message application service. It is also necessary to register a printer to a tenant server that manages information about the message application service and a cloud storage service.

SUMMARY

Embodiments of the present disclosure are directed to reducing the user's burden in inputting the authentication information in preliminary work for printing image data uploaded to a message application service, on a printer.

According to embodiments of the present disclosure, an information processing system includes an image processing apparatus, a first information processing apparatus, and a second information processing apparatus configured to transmit and receive a message, the second information processing apparatus transmitting print data based on the message to the image processing apparatus registered in the first information processing apparatus upon execution of a predetermined application, wherein the first information processing apparatus comprises a first reception unit configured to receive first authentication information input by a user, a first authentication unit configured to perform authentication based on the first authentication information received by the first reception unit, a registration unit configured to register the image processing apparatus based on the authentication by the first authentication unit to transmit the message-based print data to the image processing apparatus, and a second transmission unit configured to transmit second authentication information to the image processing apparatus upon registration of the image processing apparatus by the registration unit, wherein the image processing apparatus comprises a second reception unit configured to receive the second authentication information from the first information processing apparatus, and a third transmission unit configured to transmit the second authentication information upon reception of the second authentication information by the second reception unit, and wherein the first information processing apparatus further comprises a third reception unit configured to receives the second authentication information, and a second authentication unit configured to perform authentication for installing the predetermined application in the second information processing apparatus based on the second authentication information received by the third reception unit.

Further features of the present disclosure will become apparent from the following description of exemplary embodiments with reference to the attached drawings.

BRIEF DESCRIPTION OF THE DRAWINGS

FIG. 11 illustrates an example of a tenant registration initial screen displayed on an operation panel of the user terminal.

FIG. 12 illustrates an example of a tenant information authentication screen displayed on the operation panel of the user terminal.

FIG. 14 illustrates examples of tenant registration initial screens displayed on the operation panel of the user terminal.

FIG. 16 illustrates an example of an operation sequence of a cooperative application using the message application server with the cooperative application installed therein.

DESCRIPTION OF THE EMBODIMENTS

Figure 9:
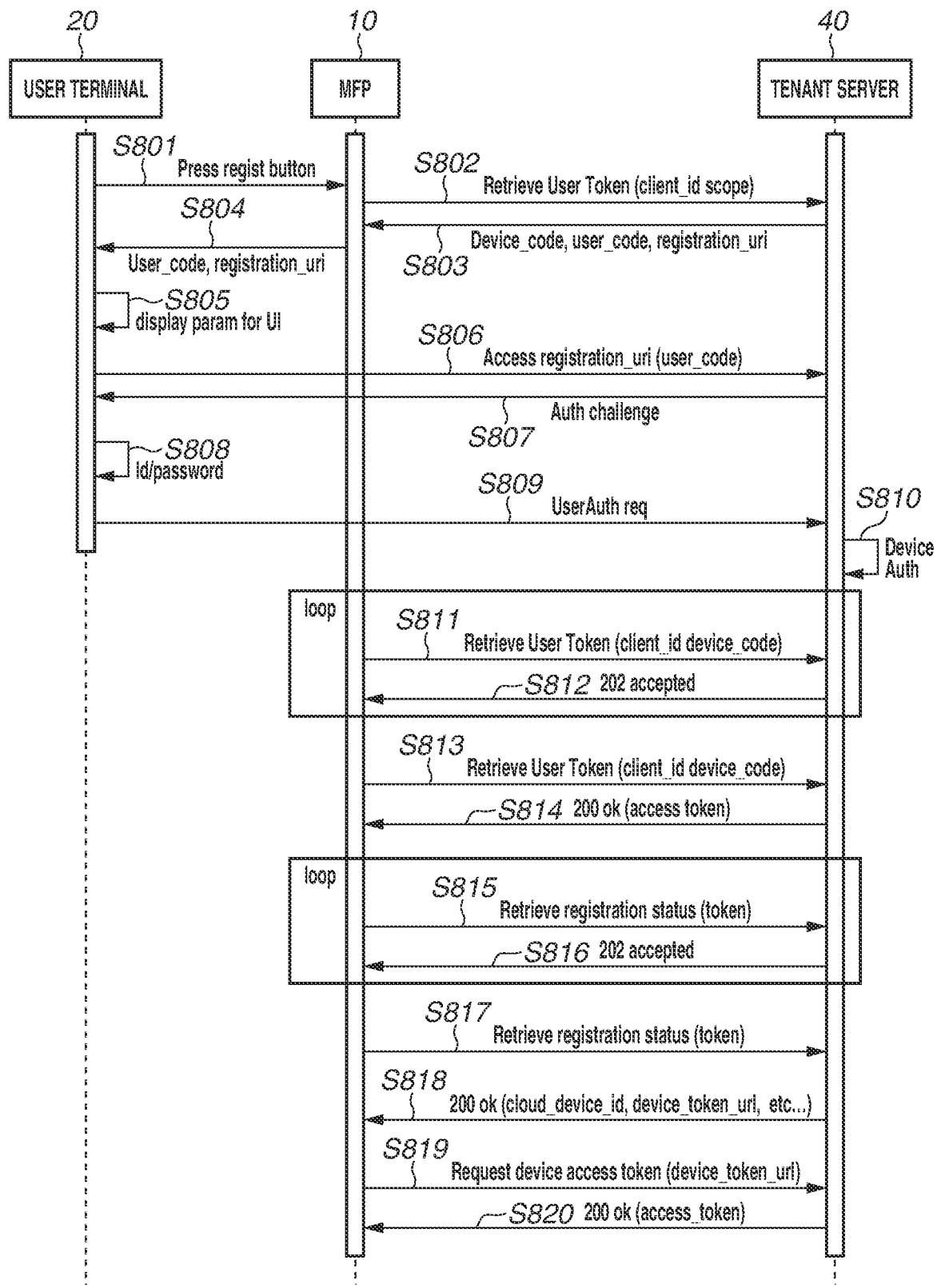
FIG. 9 illustrates an example of a sequence for registering printer information for the MFP to tenant information.
Figure 10:
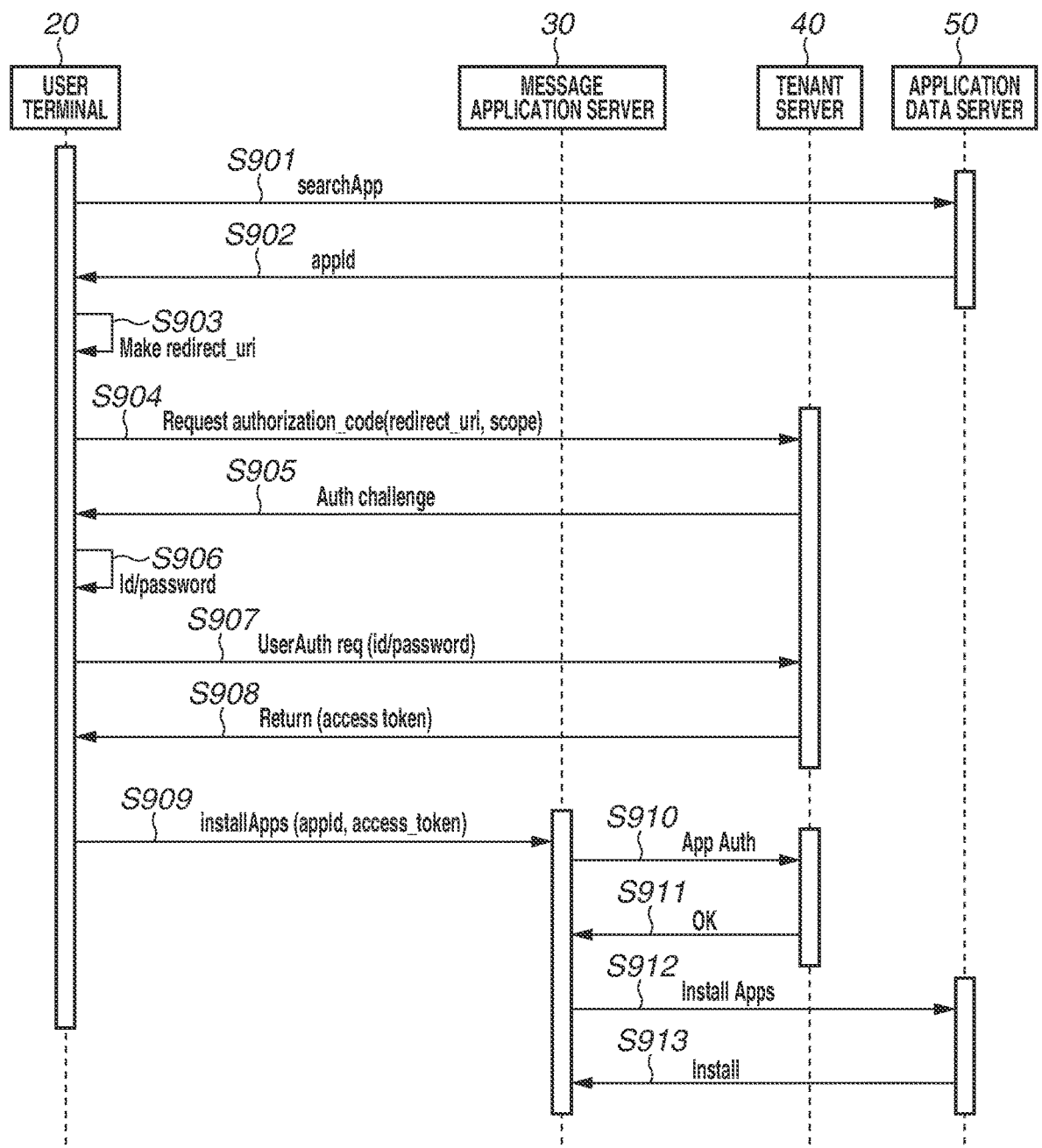
FIG. 10 illustrates an example of a sequence for installing a cooperative application to the message application server.

The following processing is required in sequences of FIGS. 9 and 10 illustrating the conventional technique. FIG. 9 illustrates the sequence for registering a printer to a tenant server, and FIG. 10 illustrates the sequence for installing a cooperative application to a message application server.

For example, when performing authentication for registering a printer to a tenant server (S810), the user needs to input authentication information (S808). When performing authentication (S910) for installing the cooperative application in the message application server (S913), the same authentication information as that input in step S808 needs to be input (S906). In other words, the user needs to input the same authentication information twice, once when performing processing for registering a printer to the tenant server and once when performing processing for installing the cooperative application to the message application server, which is a hassle.

Exemplary embodiments of the present disclosure will be described below with reference to the accompanying drawings. Configurations described in the following exemplary embodiments are merely examples, and the present disclosure is not limited to the illustrated configurations.

Figure 1:
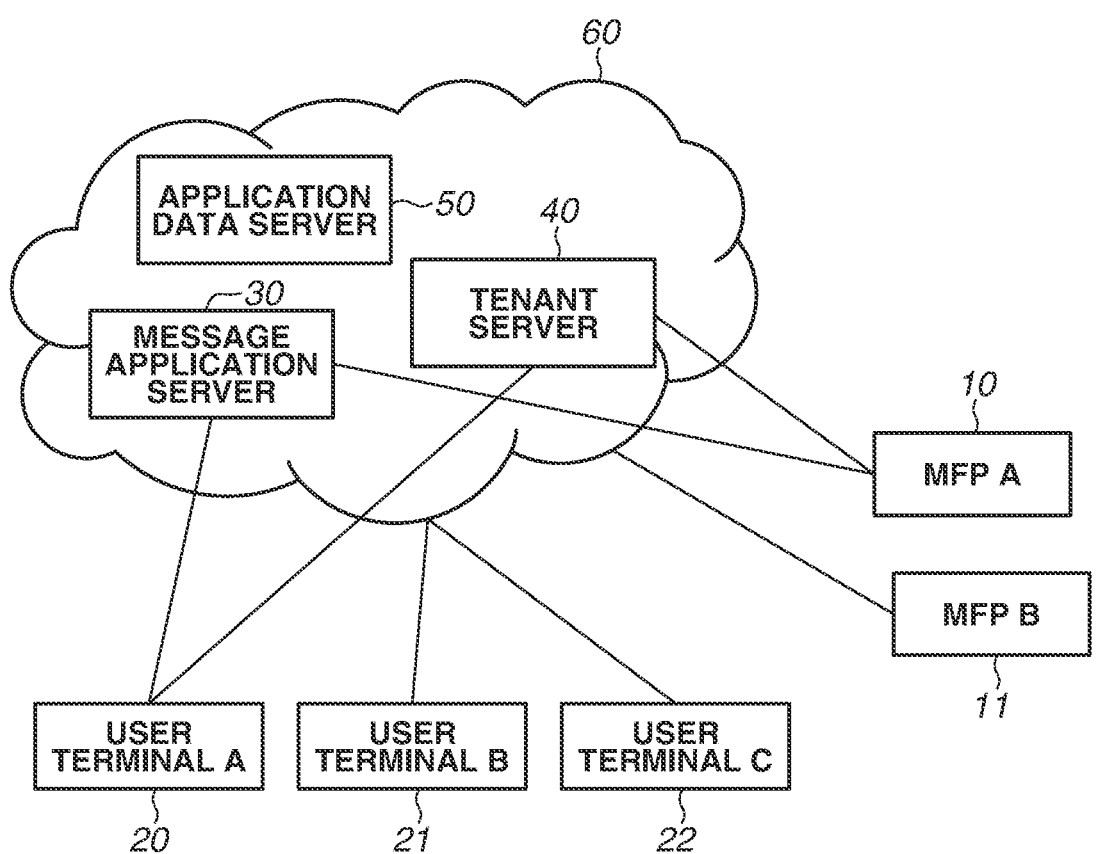
FIG. 1 illustrates an example of a system configuration of the present disclosure.

FIG. 1 illustrates an example of a system configuration of an exemplary embodiment of the present disclosure. An information processing system that provides a message application service, which is a chat service, includes Multi-Function Peripherals (MFPs) 10 and 11, which are image processing apparatuses, and user terminals 20 to 22, which are information processing apparatuses. The information processing system also includes a message application server 30, a tenant server 40, and an application data server 50.

The MFPs 10 and 11 are image forming apparatuses each having a function of printing an image notified by the message application server 30 or a function of notifying the message application server 30 of an image that has been read. While the two MFPs 10 and 11 are connected to the system in the example in FIG. 1, the number of MFPs that are connected thereto may be any number. Since the MFPs 10 and 11 have the same configuration, descriptions will be provided below with regard to the MFP 10.

The user terminals 20 to 22 are information processing apparatuses such as a smart phone, a tablet terminal, and a personal computer that users of the message application service use. While the three user terminals 20 to 22 are connected to the system in FIG. 1, the number of user terminals that is connected thereto may be any number. The user operates one of the user terminals 20 to 22 to access the message application server 30 on a cloud 60, exchange messages with other users, and execute an application installed on the message application server 30. The user terminals 20 to 22 and the message application server 30 are connected to a wired or wireless communication network, and thus each of the user terminals 20 to 22 can perform data transmission and reception. While, in the present exemplary embodiment, a public line on the Internet is assumed to be used as an example of the communication network, a dedicated line may be used. Since the user terminals 20 to 22 may have the same configuration, descriptions will be provided below with regard to the user terminal 20.

The message application server 30 is a cloud server located on the cloud 60 to provide services using a message application 306. The message application server 30 performs overall processing for message exchanges including processing for performing message transmission and reception to and from the user terminals 20 to 22, and processing for displaying message transmission and reception on a display screen. The message application server 30 is capable of processing message exchanges between two members and processing message exchanges in a group formed of at least three members.

The tenant server 40, which is a cloud server located on the cloud 60, stores and provides information about each tenant. Tenant information stored in the tenant server 40 will be described in detail below with reference to FIG. 7. A tenant, which refers to information indicating an organization, is associated with account information for a plurality of users and information about a group in which a plurality of users participates.

The application data server 50, which is a cloud server located on the cloud 60, stores data of a cooperative application 506 that can be installed in the message application 306. While, in the present exemplary embodiment, application data is stored in the application data server 50, data of the cooperative application 506 may be downloaded from a network external to the cloud 60.

Figure 2:
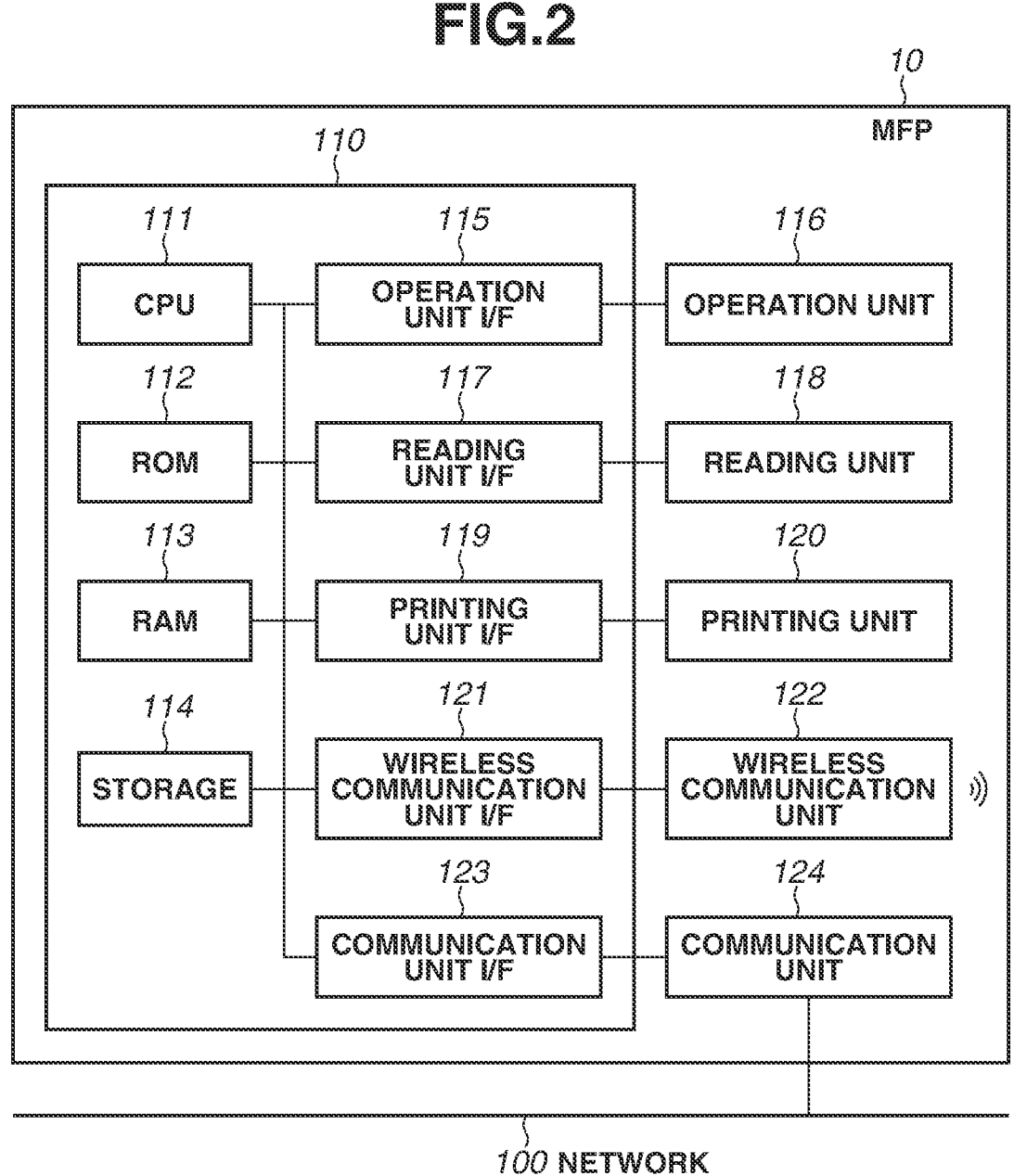
FIG. 2 illustrates an example of a hardware configuration of a multifunction peripheral (MFP).

FIG. 2 illustrates an example of a hardware configuration of the MFP 10. The MFP 10 includes a central processing unit (CPU) 111, a read only memory (ROM) 112, a random access memory (RAM) 113, a storage 114, an operation unit interface (I/F) 115, an operation unit 116, a reading unit I/F 117, a reading unit 118, a printing unit I/F 119, and a printing unit 120. The MFP 10 also includes a wireless communication unit I/F 121, a wireless communication unit 122, a communication unit I/F 123, and a communication unit 124.

A control unit 110 including the CPU 111 controls the operation of the entire MFP 10. The CPU 111 loads a control program stored in the ROM 112 or the storage 114 into the RAM 113, and performs various types of control such as read control and print control. The ROM 112 stores a control program that can be executed by the CPU 111. The ROM 112 also stores a boot program and font data. The RAM 113 serves as the main memory and is used as a work area and a temporary storage area in which various control programs stored in the ROM 112 and the storage 114 are loaded. The storage 114 stores image data, print data, various programs, various addresses, and various types of setting information. While, in the present exemplary embodiment, a flash memory is assumed to be used as the storage 114, an auxiliary storage device such as a solid state drive (SSD) or a hard disc drive (HDD) may be used. Alternatively, an embedded MultiMedia Card (eMMC) may be used.

In the MFP 10 according to the present exemplary embodiment, one CPU 111 executes processing in the flowcharts (described below) by using one memory (RAM 113), but the present disclosure is not limited thereto. For example, a plurality of CPUs, RAMs, ROMs and storages may be collaboratively operated to perform the processing in the flowcharts (described below). Part of the processing may be executed by using a hardware circuit such as an Application Specific Integrated Circuit (ASIC) or a Field Programmable Gate Array (FPGA).

The operation unit I/F 115 connects the operation unit 116 including a display unit, such as a touch panel, and hardware keys, to the control unit 110. The operation unit 116 displays information to the user and detects an input from the user.

The reading unit I/F 117 connects, for example, the reading unit 118, such as a scanner, to the control unit 110. The reading unit 118 reads an image of a document, and the CPU 111 converts the image into image data such as binary data. The image data generated based on the image read by the reading unit 118 is transmitted to an external apparatus or printed on recording paper.

The printing unit I/F 119 connects the printing unit 120, such as a printer, to the control unit 110. The CPU 111 transfers image data (print data) stored in the RAM 113 to the printing unit 120 via the printing unit I/F 119. The printing unit 120 prints an image based on the transferred image data on recording paper fed from a paper cassette.

The wireless communication unit I/F 121 is an interface for controlling the wireless communication unit 122 and for wirelessly connecting an external wireless apparatus to the control unit 110. The user terminals 20 to 22 may be used as external wireless apparatuses.

The communication unit I/F 123 connects the control unit 110 to a network 100. The communication unit I/F 123 enables the communication unit 124 to transmit image data and various types of information in the apparatus to an external apparatus on the network 100 and receive print data and information on the network 100 from an information processing apparatus on the network 100. Examples of methods for transmitting and receiving the data and information via the network 100 include a method for transmitting and receiving the data and information by e-mail and a method for transmitting a file by using another protocol such as File Transfer Protocol (FTP), Server Message Block (SMB), or Web-based Distributed Authoring and Versioning (WebDAV). Examples of methods for transmitting and receiving the data and information also include a method for transmitting and receiving image data and various types of setting data via the network 100 using Hypertext Transfer Protocol (HTTP) communication from the user terminal 20 and the message application server 30.

Figure 3:
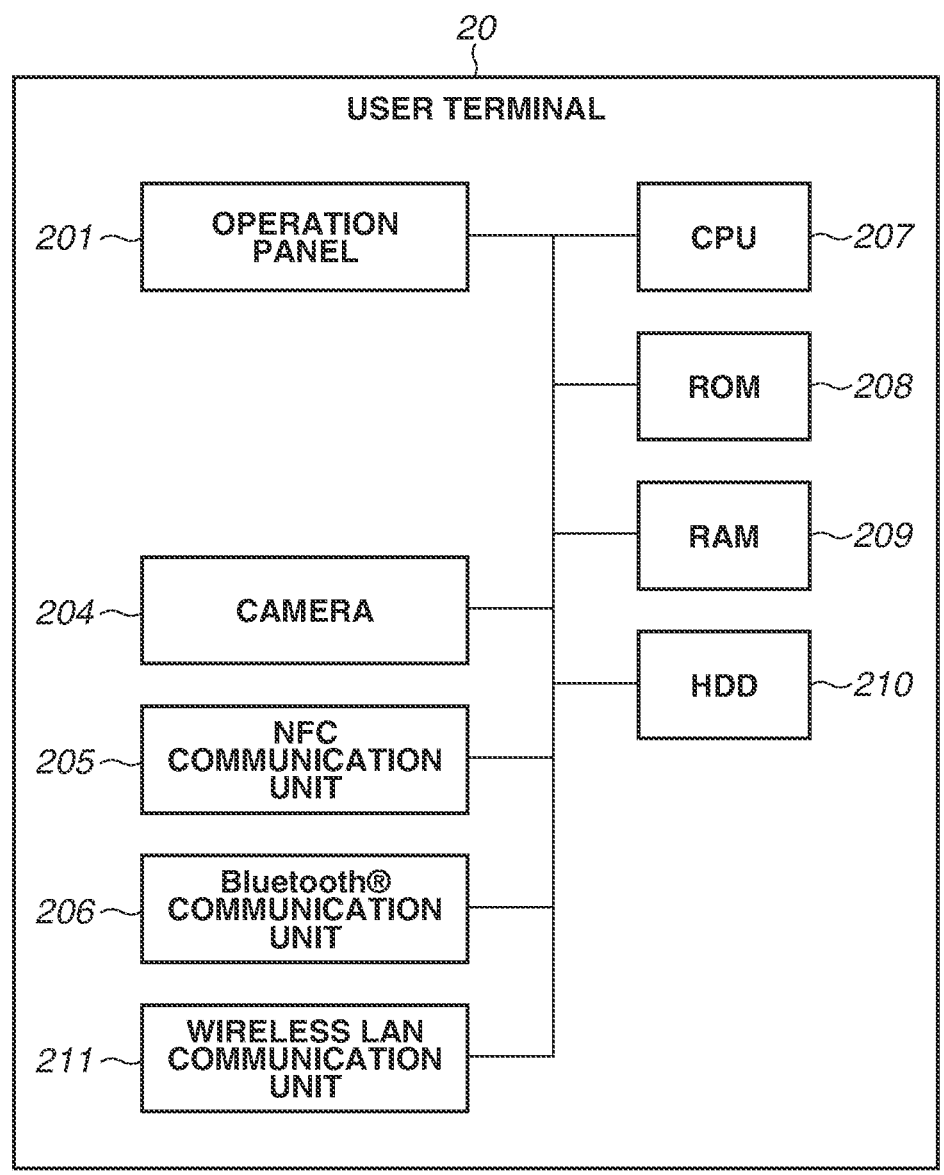
FIG. 3 illustrates an example of a hardware configuration of a user terminal.

FIG. 3 illustrates an example of a hardware configuration of the user terminal 20. While a smart phone or a tablet personal computer (PC) is assumed to be used as the user terminal 20 according to the present exemplary embodiment, the user terminal 20 may be any information processing apparatus capable of performing wired or wireless communication.

A CPU 207 reads a control program stored in a ROM 208 and executes various types of processing to control operation of the user terminal 20. The ROM 208 stores the control program. A RAM 209 is used as the main memory of the CPU 207 and a temporary storage area such as a work area. An HDD 210 stores various types of data such as a picture and an electronic document.

An operation panel 201 has a touch panel function for detecting a user's touch operation, and displays various screens provided by an operating system (OS) and an e-mail transmission application. The operation panel 201 is used to check information stored in the message application server 30. The user can input a desired operating instruction to the user terminal 20 by performing a touch operation on the operation panel 201. The user terminal 20 is provided with hardware keys (not illustrated), and thus the user can input an operating instruction to the user terminal 20 by using the hardware keys.

A camera 204 captures an image in response to an imaging instruction from the user. A picture captured by the camera 204 is stored in a predetermined area of the HDD 210. The use of a program capable of QR Code® analysis makes it possible to acquire information from a QR code read by the camera 204.

The user terminal 20 is able to perform data transmission and reception to and from various peripheral apparatuses via a Near Field Communication (NFC) communication unit 205, a Bluetooth® communication unit 206, and a wireless Local Area Network (LAN) communication unit 211. The Bluetooth® communication unit 206 of the user terminal 20 may conform to Bluetooth® Low Energy.

Figure 4:
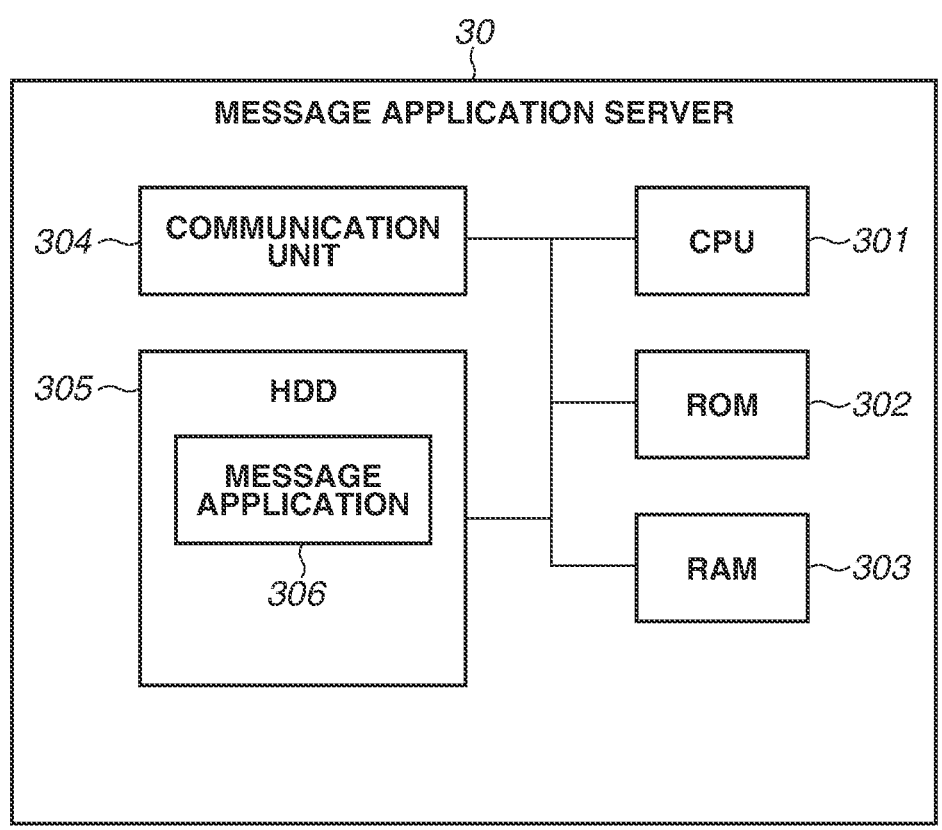
FIG. 4 illustrates an example of a hardware configuration of a message application server.

FIG. 4 illustrates an example of a hardware configuration of the message application server 30. A CPU 301 reads a control program stored in a ROM 302 and the message application 306 stored in an HDD 305, and executes various types of processing to control operation of the message application server 30. The ROM 302 stores the control program. A RAM 303 is used as the main memory of the CPU 301 and a temporary storage area such as a work area. The HDD 305 stores various types of data such as a message, an image, channel information, and an application. The message application server 30 can perform data transmission and reception to and from various apparatuses such as the user terminal 20 and the MFP 10 via a communication unit 304. The communication unit 304 may perform wired communication using Ethernet® or perform wireless communication such as Wi-Fi. The message application 306 is installed in the HDD 305 and operates on the CPU 301.

Figure 5:
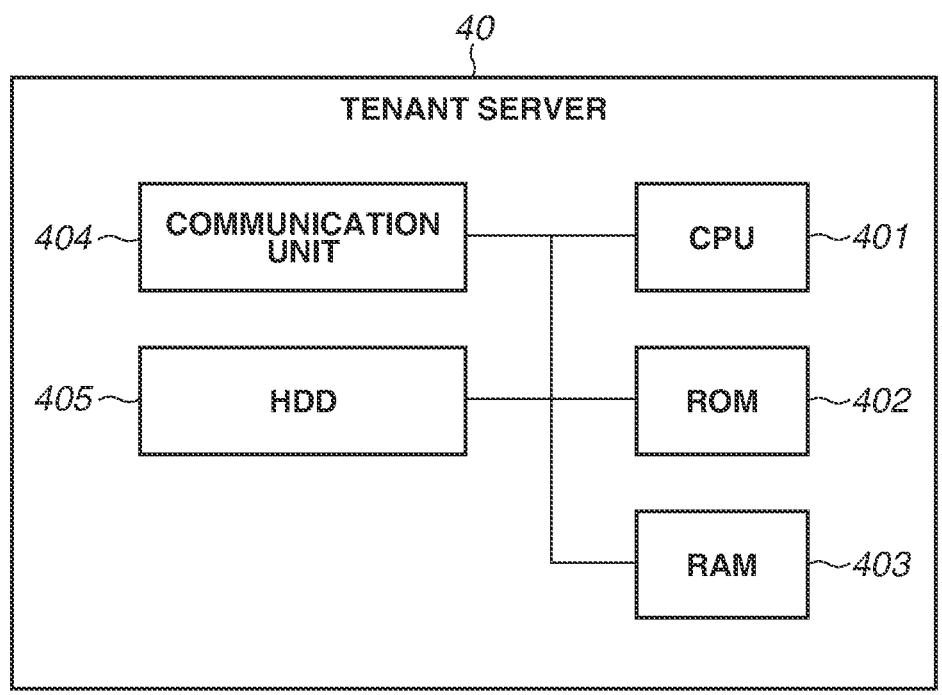
FIG. 5 illustrates an example of a hardware configuration of a tenant server.

FIG. 5 illustrates an example of a hardware configuration of the tenant server 40. A CPU 401 reads a control program stored in a ROM 402 and executes various types of processing to control tenant information 601. The tenant information 601 to be stored will be described below. The ROM 402 stores the control program. A RAM 403 is used as the main memory of the CPU 401 and a temporary storage area such as a work area. An HDD 405 stores the tenant information 601 and other information. The tenant server 40 is able to perform data transmission and reception to and from various apparatuses such as the message application server 30 via a communication unit 404.

Figure 6:
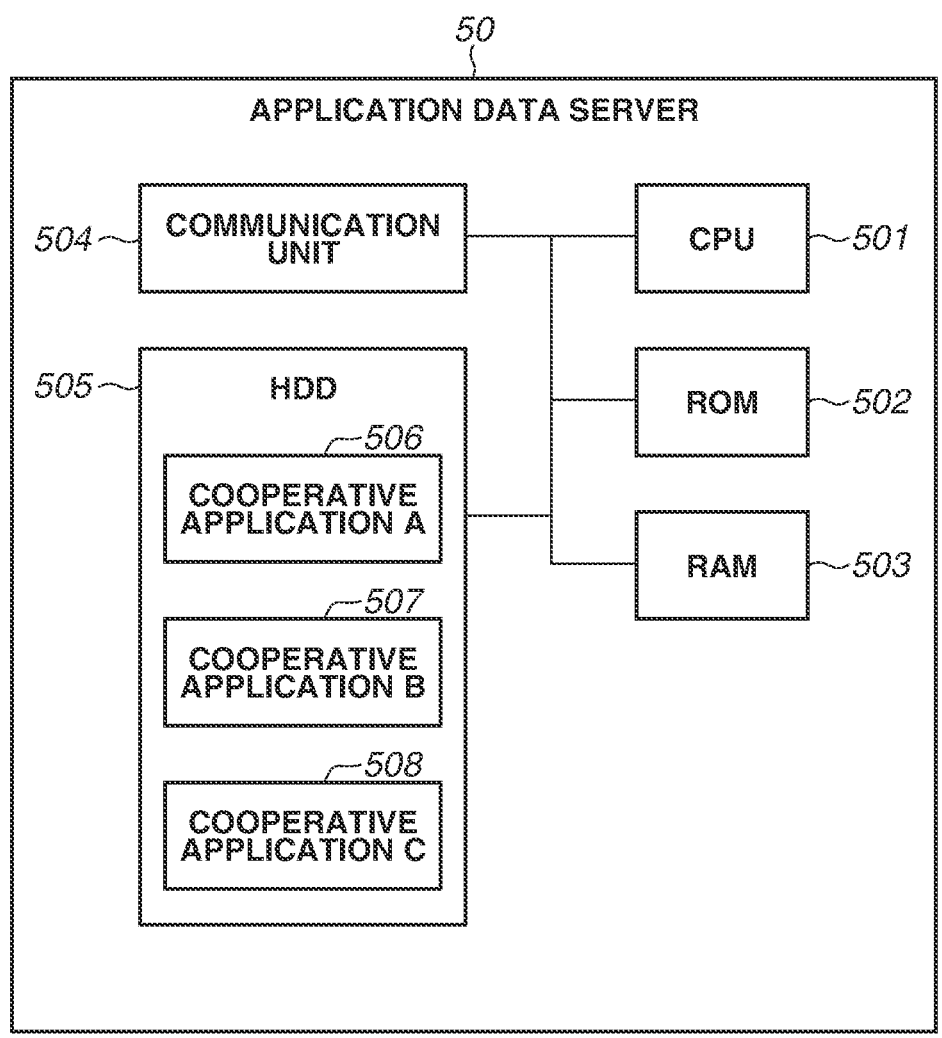
FIG. 6 illustrates an example of a hardware configuration of an application data server.

FIG. 6 illustrates an example of a hardware configuration of the application data server 50.

A CPU 501 reads a control program stored in a ROM 502 and executes various types of processing to control the application data server 50. The ROM 502 stores the control program. A RAM 503 is used as the main memory of the CPU 501 and a temporary storage area such as a work area. An HDD 505 stores cooperative applications A 506 to C 508. The application data server 50 is able to perform data transmission and reception to and from various apparatuses such as the message application server 30 via a communication unit 504. The cooperative applications A 506 to C 508 operate in cooperation with the message application 306. The cooperative applications A 506 to C are stored in the HDD 505 and installed in the HDD 305 of the message application server 30 via the communication unit 504 in response to an instruction.

Figure 7:
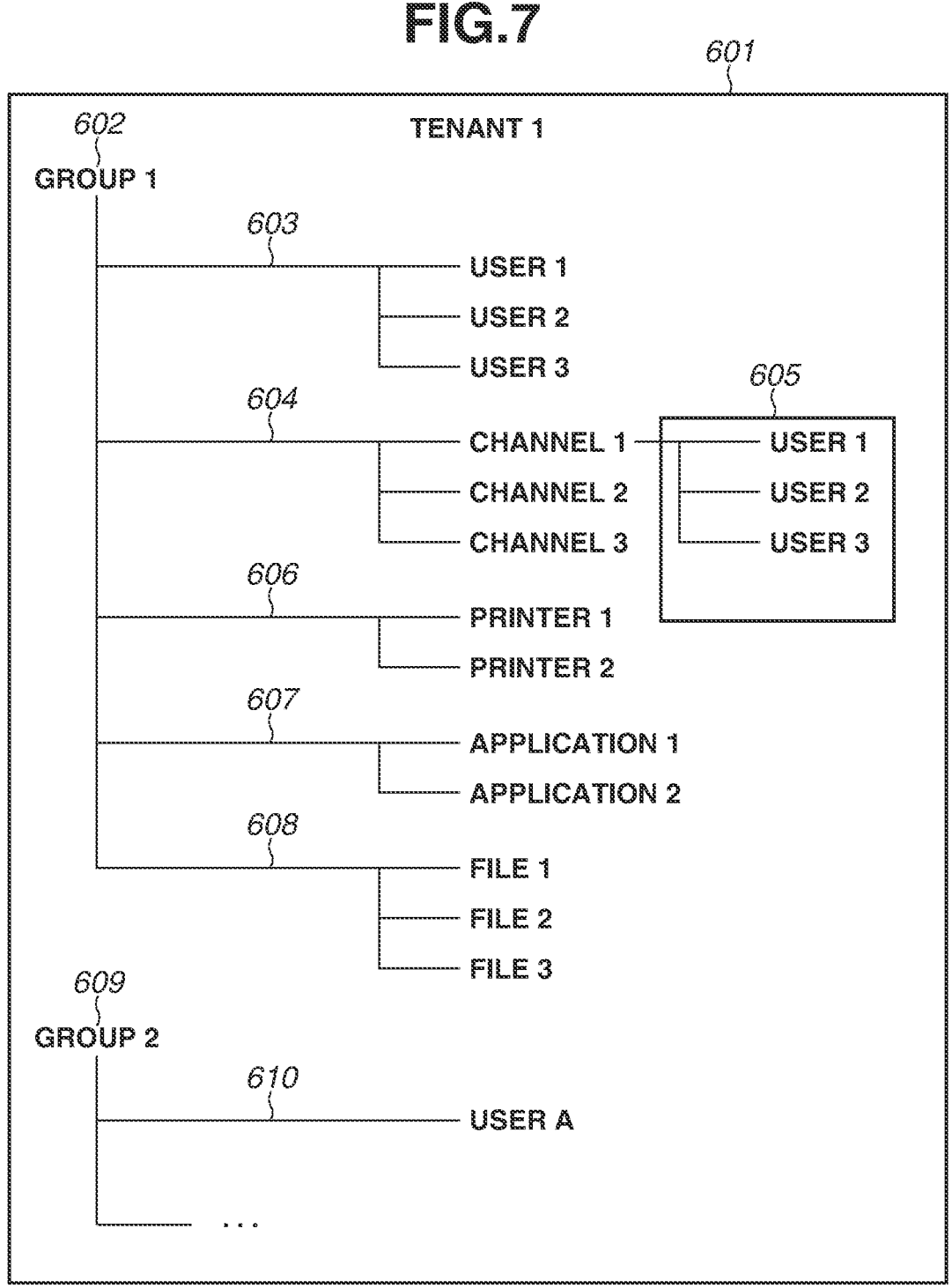
FIG. 7 illustrates an example of tenant information stored in the tenant server.

FIG. 7 illustrates an example of the tenant information 601 stored in the HDD 405 in the tenant server 40. The tenant information 601 includes at least one group. In the example in FIG. 7, the tenant information 601 includes two groups 602 and 609. Depending on the configuration of the message application 306, one piece of tenant information may include one piece of group information only. In such a case, the tenant information 601 is equivalent to the group information.

Each of the groups 602 and 609 includes information that constitutes the group. For example, the group 602 includes user information 603, channel information 604, printer information 606, cooperative application information 607, and file information 608. The user information 603 indicates information such as an identifier (ID) of each user belonging to the group 602.

The channel information 604 is used to group the user information 603 and stores a list 605 in which corresponding user information is organized for each channel.

The printer information 606 indicates device information about the MFP 10. An application using the group 602 refers to the information to enable transmission of a command such as a print command to an MFP.

The cooperative application information 607 indicates the cooperative application 506 installed in the HDD 305 where the message application 306 corresponding to the group 602 is installed.

The file information 608 indicates information about a file stored in the group 602. For example, when the file information 608 is transmitted to the MFP 10, the MFP 10 can print the file.

When a user list is referred to in the message application 306 corresponding to the tenant information 601, the message application 306 refers to information about the group 602 stored in the HDD 405 of the tenant server 40 via the communication unit 304. Then, the user information 603 is displayed in list form. This also applies to the channel information 604, the printer information 606, the cooperative application information 607, and the file information 608.

Figure 8:
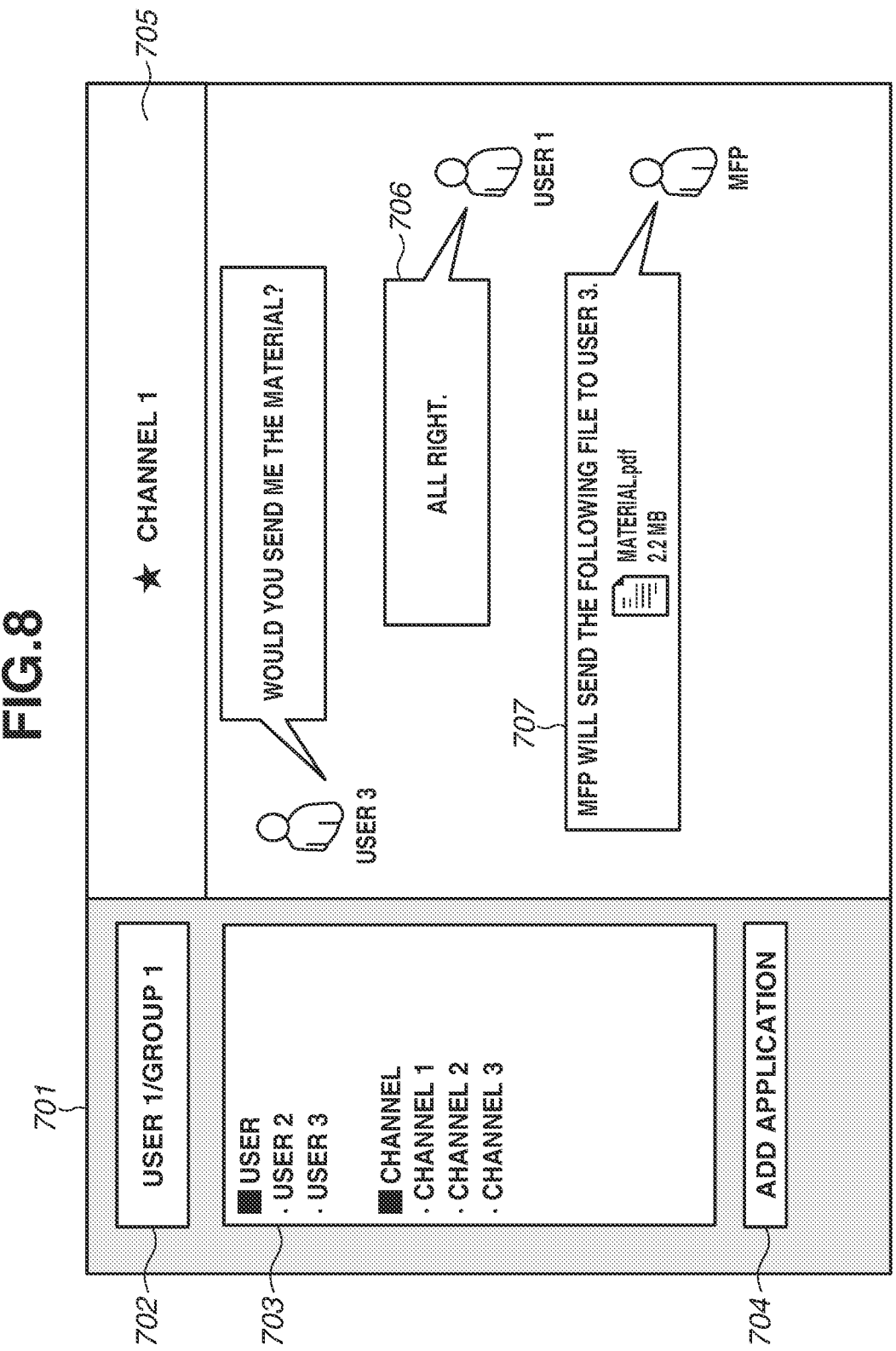
FIG. 8 illustrates an example of a message screen of a message application.

FIG. 8 illustrates an example of a message screen 701 of the message application 306. In the example of the message screen 701, the user corresponding to the user information 603 accesses the message application 306 associated with the group 602.

A display area 702 indicates the user information 603 about the user who has logged in from the user terminal 20, and information about the group 602 to which the user belongs.

A display area 703 displays other user information 603 associated with the group 602 and the channel information 604 associated with the group 602. The user is able to exchange messages with a partner selected from the display area 703 by the user. If the user selects the channel information 604, the user is able to exchange messages with all members belonging to the channel.

A button 704 is used to add the cooperative application 506. When the button 704 is pressed, the cooperative application 506 is installed in the message application server 30. While the present exemplary embodiment describes a configuration in which the cooperative application 506 is installed, a configuration may be used in which other cooperative applications are displayed in list form to prompt the user to select a cooperative application to be installed.

A display area 705 displays the partner or channel of the current message exchange. More specifically, the partner selected in the display area 703 is displayed in the display area 705. Referring to FIG. 8, since Channel 1 is selected, Channel 1 is displayed in the display area 705.

Messages 706 and 707 are messages on a timeline indicating a history of message exchanges. A message may include only text as in the message 706, or may be attached with the file information 608 as in the message 707.

FIG. 9 illustrates an example of a sequence diagram of a conventional method for registering the printer information 606 of the MFP 10 to the tenant information 601. The sequence is started when a tenant registration initial screen 1010 illustrated in FIG. 11 is displayed on the operation panel 201 of the user terminal 20. The tenant registration initial screen 1010 illustrated in FIG. 11 and a tenant information authentication screen 1110 illustrated in FIG. 12 will be described below together with the sequence diagram.

FIG. 11 illustrates an example of the tenant registration initial screen 1010 displayed on the operation panel 201 of the user terminal 20.

FIG. 12 illustrates an example of the tenant information authentication screen 1110 displayed on the operation panel 201 of the user terminal 20.

In step S801, when the user presses a tenant registration button 1011 displayed on the tenant registration initial screen 1010 in FIG. 11, the CPU 207 of the user terminal 20 transmits a tenant information registration request to the MFP 10. The tenant registration button 1011 in FIG. 11 is displayed based on screen data received from the MFP 10 by the user terminal 20. The screen data is, for example, Hypertext Markup Language (HTML) data received from the WEB server of the MFP 10 using HTTP communication. Connection information (such as Uniform Resource Locator (URL)) that enables the MFP 10 to access the tenant server 40 to which the tenant information registration request is to be transmitted is prestored in the storage 114 of the MFP 10.

In step S802, the CPU 111 of the MFP 10 transmits a device authentication request to the tenant server 40. At this time, the CPU 111 notifies the tenant server 40 of a client ID for identifying the request in subsequent inquiries and a scope of authentication to be requested, as additional information. Processing to be permitted by the authentication requested in the sequence includes registering information about the MFP 10 to the tenant server 40 as the printer information 606, changing the registered printer information 606, and performing image processing control by using the printer information 606 to be registered.

In step S803, the CPU 401 of the tenant server 40 returns an authentication request response to the MFP 10. Information to be returned as response information includes a device code indicating subsequent authentication request information between the MFP 10 and the tenant server 40, a user code indicating the authentication request information between the user terminal 20 and the tenant server 40, and a registration Uniform Resource Identifier (URI) for sign-in based on the user code.

In step S803 and subsequent steps, the MFP 10 continues polling to make an inquiry to the tenant server 40 about whether the device has been authenticated by using the client ID and the device code (S811). The tenant server 40 continues returning Access Token Unissued to the MFP 10 until the device authentication is completed in step S810 (S812). In parallel with such processing, processing in step S804 and subsequent steps is performed.

In step S804, the CPU 111 of the MFP 10 notifies the user terminal 20 of the user code and the registration URI acquired in step S803.

In step S805, the CPU 207 of the user terminal 20 displays the user code and the registration URI acquired in step S804 on the operation panel 201. A tenant registration information display screen 1020 illustrated in FIG. 11 is an example of a screen displayed on the operation panel 201 in step S805. The screen displays a registration URI 1021 and a registration code 1022, which is the user code.

FIG. 12 illustrates tenant information authentication screens displayed on the operation panel 201 of the user terminal 20. When the user accesses the registration URI displayed on the operation panel 201 in FIG. 11, the screen 1110 for inputting the user code (registration code) is displayed. The user inputs the user code in an input field 1111 and presses an OK button 1112 to request the tenant server 40 for the user authentication.

Referring back to FIG. 9, in step S806, the user terminal 20 requests the tenant server 40 for the user authentication when the user presses the OK button 1112. The user code input in the input field 1111 is notified to the tenant server 40.

In step S807, the tenant server 40 requests the user terminal 20 to acquire information for the user authentication.

In step S808, the user inputs the authentication information (ID and password) corresponding to the tenant in which the user participates. A user authentication screen 1120 illustrated in FIG. 12 is displayed on the operation panel 201 in step S808. When the user inputs the tenant authentication information in input fields 1121 and presses an OK button 1122, the processing proceeds to step S809. The tenant authentication information input here is used to log into the tenant in which the user participates, and is the authentication information set for each user.

In step S809, the CPU 207 of the user terminal 20 transmits the authentication information to the tenant server 40.

In step S810, the tenant server 40 performs authentication by using the received authentication information. When the tenant server 40 determines that the user corresponding to the received authentication information has the authentication right to add device information, the tenant server 40 permits the device authentication.

Figure 15:
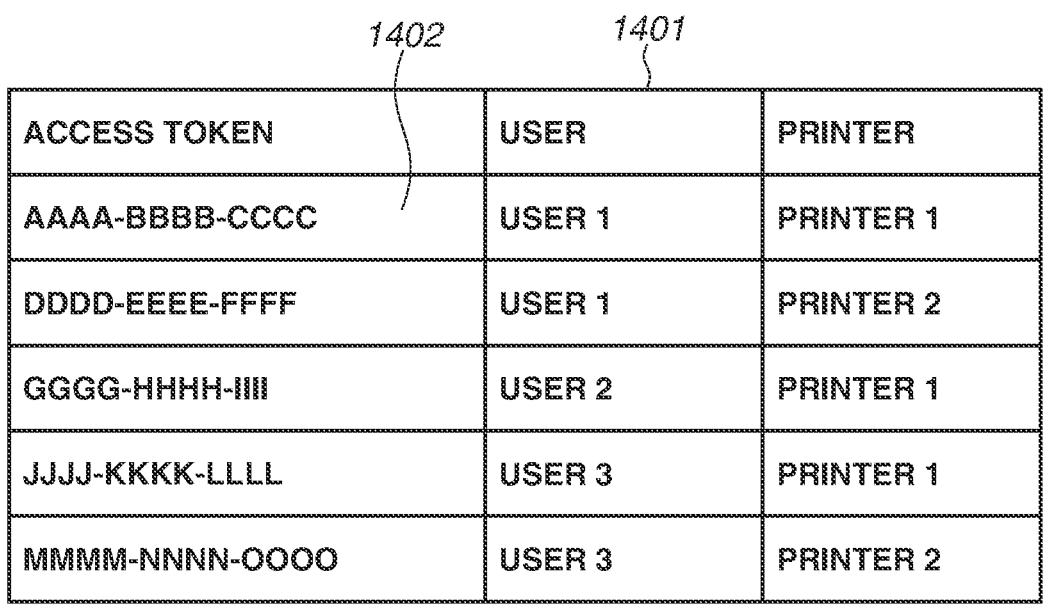
FIG. 15 illustrates an example of a table representing a correspondence between user information, the printer information, and an access token used in the tenant server.

FIG. 15 illustrates an example of a table representing the correspondence between the user information, the printer information, and an access token used by the tenant server 40. A table 1401 is generated in the device registration sequence S810 and is stored in the HDD 405 in the tenant server 40. As illustrated in FIG. 15, the table 1401 stores the user information and the printer information for the authenticated user in association with each other, and each combination of the user information and the printer information is attached with a control access token 1402.

As described above, steps S811 and S812 for confirming the device authentication are repeated until step S810 is executed. The processing in step S813 is the same as that in step S811. Upon completion of the device authentication processing in step S810, the processing proceeds to step S814. In step S814, the tenant server 40 returns information indicating the authentication completion as a response to the device authentication confirmation in step S813.

When the device authentication processing in step S810 is completed, then in step S814, the tenant server 40 returns the device authentication confirmation to the MFP 10. The tenant server 40 returns an authentication access token related with the authenticated device as the return value.

The processing in step S815 is the same as that in step S817. The CPU 111 of the MFP 10 requests the tenant server 40 for the device registration by polling until a registration completion notification is acquired, by using the authentication access token. When the registration is not completed, the tenant server 40 returns Accepted to the MFP 10 in step S816, and the MFP 10 performs step S815 again. On the other hand, when the registration is completed, the processing proceeds to step S818.

When the device registration is completed, then in step S818, the CPU 401 of the tenant server 40 returns OK to the MFP 10. At this time, the tenant server 40 also notifies the MFP 10 of a unique ID distributed to the printer and a device token acquisition URI to be accessed for subsequent processing for acquiring the control access token 1402.

In step S819, the MFP 10 requests the tenant server 40 to acquire the control access token 1402 by using the device token acquisition URI acquired in step S818. At this time, the MFP 10 notifies the tenant server 40 of the authentication access token as the authentication information.

In step S820, the tenant server 40 returns the control access token 1402 to the MFP 10.

The above-described configuration enables registration of the printer information 606 on the tenant server 40. Subsequently, the MFP 10 is able to issue a control request to the tenant server 40 by using the control access token 1402 notified in step S820.

The above-described operation enables registration of the MFP 10 to the tenant server 40. As a result of the MFP 10 being registered to the tenant server 40, the image data uploaded by the message application 306 can be printed on the MFP 10. Specific print processing will be described below with reference to FIG. 16.

FIG. 10 illustrates an example of a sequence diagram of a conventional method for installing the cooperative application 506 in the message application server 30. FIG. 10 illustrates a sequence for installing the cooperative application 506 in the message application server 30 in which the message application 306 associated with the group 602 has been installed. As a result of the cooperative application 506 being installed in the message application server 30, the user can issue an instruction for transmitting a print job to the MFP 10 on the message application 306. In addition, the message application server 30 can transmit a print job to the MFP 10. Specific processing will be described below with reference to FIG. 16.

The sequence is started when the user specifies installation of the cooperative application 506 from the operation panel 201 of the user terminal 20.

In step S901, the user terminal 20 makes an inquiry to the application data server 50 about whether data of the cooperative application 506 to be installed in the message application 306 exists in the HDD 505 of the application data server 50. When the cooperative application 506 exists in the HDD 505, then in step S902, the application data server 50 returns a unique application ID indicating the cooperative application 506 to the user terminal 20.

In step S903, the CPU 207 of the user terminal 20 generates a URI for an authentication request by using the application ID acquired in step S902.

In step S904, the CPU 207 of the user terminal 20 requests the tenant server 40 for authentication for installing the cooperative application 506 in the message application server 30, by using the URI generated in step S903. At this time, the CPU 207 notifies the tenant server 40 of the scope of the authentication to be requested, as additional information. Processing to be permitted by the authentication to be requested in the sequence includes installing the cooperative application 506 in the message application server 30, and changing a setting of the cooperative application 506 by using the message application 306.

In step S905, the CPU 401 of the tenant server 40 requests the user terminal 20 to acquire the authentication information.

In step S906, the user inputs the authentication information corresponding to the tenant in which the user participates, and the operation panel 201 of the user terminal 20 accepts the user input. The authentication information input here is the same as the authentication information input in step S908 in FIG. 10.

In step S907, the CPU 207 of the user terminal 20 transmits the input authentication information to the tenant server 40.

In step S908, the CPU 401 of the tenant server 40 performs user authentication by using the authentication information received in step S907. When the CPU 401 of the tenant server 40 determines that the identified user information 603 has the authentication right to install an application, the CPU 401 of the tenant server 40 notifies the user terminal 20 of the access token for authenticating application installation.

In step S909, the CPU 207 of the user terminal 20 requests the message application server 30 to install the cooperative application 506. At this time, the CPU 207 transmits the application ID acquired in step S902 and the access token acquired in step S908 as additional information to the message application server 30.

In step S910, the CPU 301 of the message application server 30 requests the tenant server 40 to confirm whether the application installation has been authenticated. At this time, the CPU 301 transmits the received access token to the tenant server 40.

In step S911, the tenant server 40 performs the authentication by using the access token and, if the authentication is successful, transmits a response of the successful authentication to the message application server 30.

In step S912, the CPU 301 of the message application server 30 requests the application data server 50 for the data of the cooperative application 506. At this time, the CPU 301 transmits the received application ID to the application data server 50.

In step S913, the application data server 50 transmits the data of the cooperative application 506 corresponding to the received application ID to the message application server 30. Then, the CPU 301 of the message application server 30 installs the received cooperative application 506.

The above-describes configuration enables the user to install the cooperative application 506 stored in the HDD 505 of the application data server 50 to the HDD 305 of the message application server 30.

The above-described processing enables installation of the cooperative application 506 for transmitting a print job on the message application 306, in the message application server 30. Then, the user is able to transmit the print job to the MFP 10 by using the cooperative application 506 on the message application 306. Further, as a result of the processing in FIG. 9 being executed, the MFP 10 is registered in the tenant server 40, and thus the user can specify the MFP 10 that is the transmission destination of the print job by using the cooperative application 506.

To enable the user to issue an instruction for transmitting a print job to the MFP 10 on the message application 306, it is necessary that the MFP 10 be registered to the tenant server 40 and that the cooperative application 506 be installed in the message application server 30.

In the conventional techniques illustrated in FIGS. 9 and 10, the user needs to input the same authentication information in both the processing for installing the cooperative application 506 to the message application server 30 and the processing for registering the MFP 10 to the tenant server 40, which is a hassle.

The present exemplary embodiment is directed to reducing the user's hassle in issuing an instruction for transmitting a print job to the MFP 10 on the message application 306. The following processing is executed to solve the above-described issue.

Figure 13:
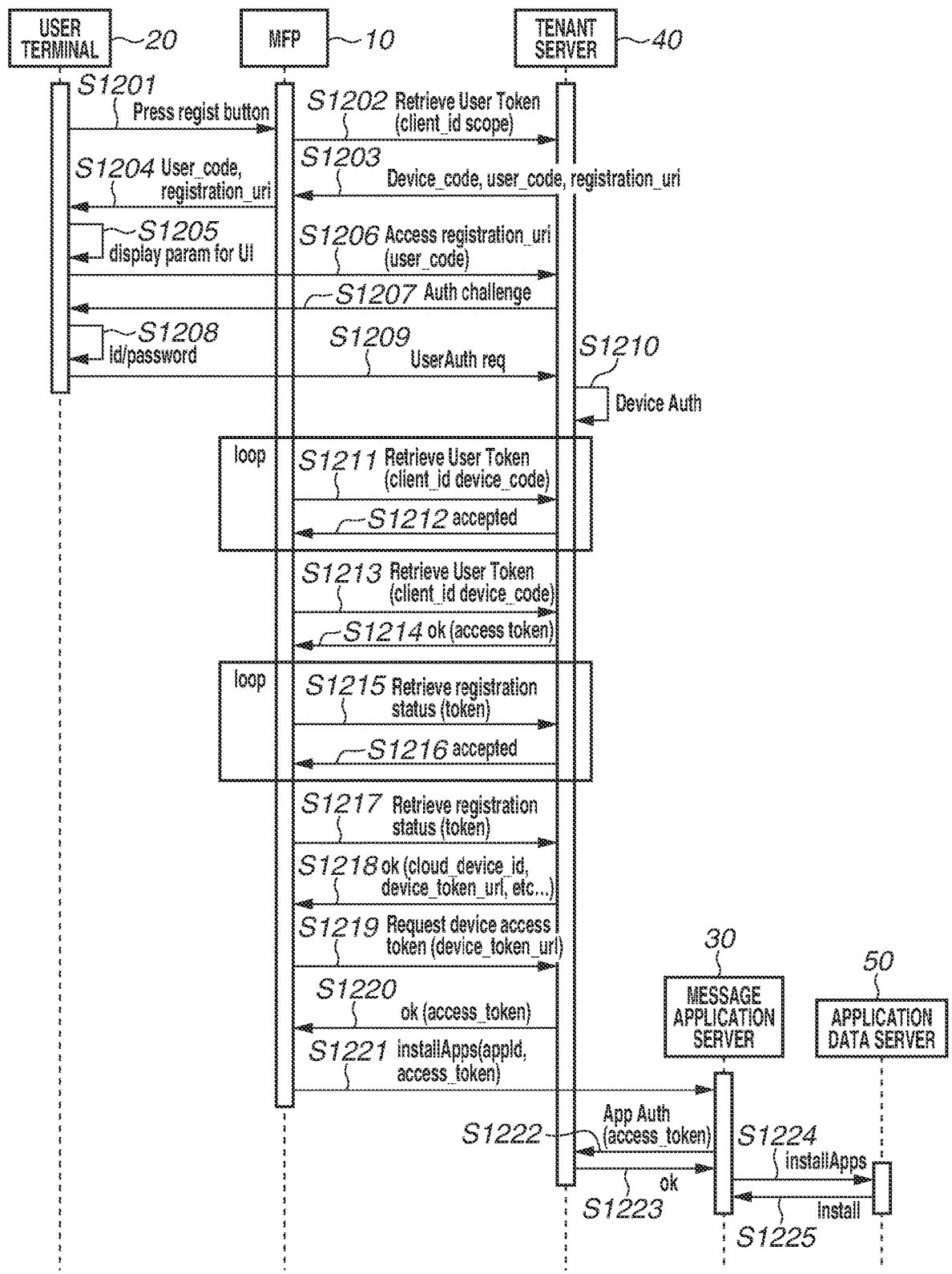
FIG. 13 illustrates an example of a sequence including processing for registering the printer information for the MFP to the tenant information and processing for installing the cooperative application to the message application server.

FIG. 13 illustrates an example of a sequence of the processing for registering the printer information 606 of the MFP 10 to the tenant information 601 and the processing for installing the cooperative application 506 in the message application server 30. The sequence is started when a tenant registration initial screen 1310 illustrated in FIG. 14 is displayed on the operation panel 201 on the user terminal 20.

FIG. 14 illustrates an example of each of the tenant registration initial screens 1310 and 1320 displayed on the operation panel 201 on the user terminal 20. When the user presses a tenant registration button 1311 in the tenant registration initial screen 1310, the CPU 207 of the user terminal 20 requests the MFP 10 to register the tenant information. When the user checks a check box 1312 and then presses the tenant registration button 1311, the CPU 207 of the user terminal 20 requests the MFP 10 to register the tenant information and install the cooperative application 506 at the same time. In step S1201, the user presses the tenant registration button 1311 in a state where the check box 1312 is checked, and the operation panel 201 of the user terminal 20 accepts the press of the tenant registration button 1311.

In step S1202, the CPU 111 of the MFP 10 transmits a device authentication request to the tenant server 40. At this time, the CPU 111 notifies the tenant server 40 of a client ID for identifying the request in subsequent inquiries and a scope of authentication to be requested, as additional information. Processing to be permitted by the authentication requested in the sequence includes registering information about the MFP 10 to the tenant server 40 as the printer information 606, changing the registered printer information 606, and performing image processing control by using the printer information 606 to be registered. Processing to be permitted by the authentication requested also includes installing the cooperative application 506 in the message application server 30, and changing a setting of the cooperative application 506 by using the message application 306.

In step S1203, the CPU 401 of the tenant server 40 transmits a response to the authentication request to the MFP 10. Information to be returned as response information includes a device code indicating the subsequent authentication request information between the MFP 10 and the tenant server 40, a user code indicating the authentication request information between the user terminal 20 and the tenant server 40, and a registration URI for sign-in based on the user code.

In step S1203 and subsequent steps, the CPU 111 of the MFP 10 continues polling to make an inquiry to the tenant server 40 about whether the device has been authenticated by using the client ID and the device code (S1211). The tenant server 40 continues returning Access Token Unissued to the MFP 10 until the device authentication is completed in step S1210 (S1212). In parallel with such processing, processing in step S1204 and subsequent steps is performed.

In step S1204, the CPU 111 of the MFP 10 notifies the user terminal 20 of the user code and the registration URI acquired in step S1203.

In step S1205, the CPU 111 of the user terminal 20 displays the user code and the registration URI acquired in step S1204 on the operation panel 201. A tenant registration information display screen displayed when the URI is accessed is the same as that in FIG. 12, and thus a redundant description thereof is omitted.

In step S1206, the CPU 207 of the user terminal 20 requests the tenant server 40 for the user authentication when the user inputs the user code (registration code) and presses the OK button 1112 in FIG. 12. As a result of step S1206, the user terminal 20 notifies the tenant server 40 of the user code.

In step S1207, the CPU 401 of the tenant server 40 requests the user terminal 20 to acquire information for the user authentication.

In step S1208, the user inputs the authentication information corresponding to the tenant in which the user participates. The user authentication screen 1120 illustrated in FIG. 12 is displayed on the operation panel 201 in step S1208. When the user inputs the tenant authentication information in the input fields 1121 and presses the OK button 1122, the processing proceeds to step S1209.

In step S1209, the CPU 207 of the user terminal 20 transmits the input authentication information to the tenant server 40. The CPU 207 transmits the authentication information as a response to the accessed URI. Since the URI and the information about the MFP 10 are registered in association with each other in the tenant server 40, the tenant server 40 can identify which MFP 10 is to be registered upon reception of the authentication information as a response to the URI.

The information about the MFP 10 corresponding to the URI includes identification information for identifying the MFP 10. The information may include the IP address of the MFP 10 and the name of the MFP 10.

In step S1210, the CPU 401 of the tenant server 40 performs the user authentication by using the received authentication information. When the CPU 401 determines that the user information 603 indicated by the authentication information has the authentication right to add device information, the CPU 401 permits the device authentication. More specifically, the CPU 401 of the tenant server 40 determines whether to register the MFP 10 to the tenant server 40 based on the received authentication information.

As described above, steps S1211 and S1212 for confirming the device authentication are repeated until step S1210 is executed. The processing in step S1213 is the same as that in step S1211. Upon completion of the device authentication processing in step S1210, the processing proceeds to step S1214. In step S1214, the CPU 401 transmits information indicating the authentication completion as a response to the device authentication confirmation in step S1213.

When the device authentication processing in step S1210 is completed, then in step S1214, the CPU 401 of the tenant server 40 returns information indicating the device authentication confirmation to the MFP 10. More specifically, the CPU 401 returns the authentication access token related with the authenticated device as the return value.

The processing in step S1215 is the same as that in step S1217. The CPU 111 of the MFP 10 requests the tenant server 40 for the device registration by polling until a registration completion notification is acquired, by using the authentication access token. When the registration is not completed, the tenant server 40 returns Accepted to the MFP 10 in step S1216, and the MFP 10 performs step S1215 again. On the other hand, when the registration is completed, the processing proceeds to step S1218.

When the device registration is completed, then in step S1218, the CPU 401 of the tenant server 40 returns OK to the MFP 10. At this time, the tenant server 40 also notifies the MFP 10 of a unique ID distributed to the printer and a device token acquisition URI to be accessed for the subsequent processing for acquiring the control access token 1402.

In step S1219, the CPU 111 of the MFP 10 requests the tenant server 40 to acquire the control access token 1402 by using the device token acquisition URI acquired in step S1218. At this time, the MFP 10 transmits the authentication access token to the tenant server 40 as the authentication information.

In step S1220, the tenant server 40 returns the control access token 1402 to the MFP 10.

While the present exemplary embodiment has been described above using an example where, upon registration of the MFP 10 in step S1210, the MFP 10 receives the authentication access token in step S1214 and then acquires the control access token 1402 by using the authentication access token, the present exemplary embodiment is not limited to the above-described example. For example, upon registration of the MFP 10 in step S1210, the CPU 401 of the tenant server 40 may transmit the control access token 1402 to the MFP 10. In such a case, the CPU 111 of the MFP 10 transmits the received control access token 1402 and a request for installing the cooperative application 506 to the message application server 30.

In step S1221, upon reception of the control access token 1402, the CPU 111 of the MFP 10 requests the message application server 30 to install the cooperative application 506. At this time, the CPU 111 transmits the control access token 1402 acquired in step S1214 and the application ID uniquely identifying the cooperative application 506 as attached information to the message application server 30. The application ID transmitted in the present step is pre-stored in the storage 114 of the MFP 10. Thus, in the conventional technique, the user needs to search for the application ID of the cooperative application 506 and then transmit the application ID to the application data server 50. Such a hassle can be omitted in the present step.

In step S1222, the CPU 301 of the message application server 30 transmits the control access token 1402 acquired in step S1221 to the tenant server 40 to request the tenant server 40 to confirm whether the application installation has been authenticated. More specifically, the CPU 401 of the tenant server 40 performs the authentication based on the control access token 1402 and determines whether to permit the installation of the cooperative application 506 in the message application server 30.

In step S1223, the CPU 401 of the tenant server 40 transmits a response to the message application server 30 to notify the message application server 30 that the tenant server 40 has confirmed that the application installation has been authenticated.

In step S1224, the CPU 301 of the message application server 30 requests the application data server 50 to transmit the data of the cooperative application 506.

In step S1225, the CPU 501 of the application data server 50 transmits the data of the cooperative application 506 to the message application server 30.

Then, the CPU 301 of the message application server 30 installs the received cooperative application 506.

The above-described configuration makes it possible to prompt the user to input the authentication information required to install the cooperative application 506 in the message application server 30 and register the MFP 10 to the tenant server 40 only once.

FIG. 16 illustrates an example of a sequence diagram for using the cooperative application 506 installed in the message application server 30. In the present exemplary embodiment, the cooperative application 506 has a function of transmitting image data received from the user terminal 20 to the MFP 10 to request the MFP 10 for print control. The function will be described below.

The sequence represents operation in a case where the cooperative application 506 has been installed in the HDD 305 of the message application server 30 after implementation of the sequences illustrated in FIGS. 10 and 13. In the sequence, the message application server 30 executes the cooperative application 506. As illustrated in the sequences in FIGS. 9 and 13, processing for registering the MFP 10 in the tenant server 40 is executed.

In the sequence in FIG. 16, all steps with regard to the message application server 30 are executed by execution of the cooperative application 506.

In step S1501, the CPU 207 of the user terminal 20 requests the message application server 30 to transmit a list of the printer information 606 associated with the tenant in which the user of the user terminal 20 participates.

In step S1502, the CPU 301 of the message application server 30 requests the tenant server 40 to transmit a list of the printer information 606 associated with the tenant information 601.

In step S1503, the tenant server 40 requests the user terminal 20 to acquire information for the user authentication.

In step S1504, the user inputs the authentication information corresponding to the tenant in which the user participates. The authentication information input here is similar to the ID and password input to the input fields 1121 in FIG. 12. The operation panel 201 of the user terminal 20 accepts the authentication information input by the user.

In step S1505, the CPU 207 of the user terminal 20 transmits the authentication information received in step S1504 to the tenant server 40.

In step S1506, the CPU 401 of the tenant server 40 performs the authentication by using the received authentication information. When the authentication is successful, the CPU 401 of the tenant server 40 searches for printers that can be used by the user information 603 corresponding to the authentication information, in the table 1401. Then, based on a search result, the CPU 401 transmits a list of the usable printer information 606 and the control access token 1402 to the message application server 30. Referring to the example in FIG. 15, when the tenant server 40 receives the authentication information for User 1, the tenant server 40 transmits "Printer 1" and "Printer 2" as the printer information 606 and "AAAA-BBBB-CCCC" and "DDDD-EEEE-FFFF" as the control access token 1402.

In step S1507, the CPU 301 of the message application server 30 transmits the list (the printer information 606 and the control access token 1402) acquired in step S1505 to the user terminal 20.

In step S1508, the CPU 207 of the user terminal 20 displays the received printer information 606 as usable printers on the operation panel 201. The user selects a printer from among the printers. The user specifies the image data uploaded to the message application server 30 as a message, as printing target image data. For example, referring to the example in FIG. 8, when the message 707 with a file attached thereto is specified, the file "Material.pdf" is specified as the printing target image data. In this case, the user may specify a plurality of pieces of image data. To specify image data, the user transmits a message, for example, "Please print Material.pdf" to the message application server 30. Then, the message application server 30 interprets the message. More specifically, the message application server 30 is able to interpret the message received from the user and then, based on the message, transmits image data (print data) to the MFP 10.

The message application server 30 may interpret a received message and then specify a printer based on the message.

In step S1509, the CPU 207 of the user terminal 20 transmits the control access token 1402 of the printer selected in step S1508 and the printing target image data to the message application server 30.

In step S1510, the CPU 301 of the message application server 30 transmits the control access token 1402 received in step S1509 to the tenant server 40.

In step S1511, the CPU 401 of the tenant server 40 transmits the printer information 606 corresponding to the received control access token 1402 to the message application server 30.

In step S1512, the CPU 301 of the message application server 30 transmits image data and a print request to the MFP 10 corresponding to the printer information 606. More specifically, the CPU 301 of the message application server 30 identifies the MFP 10 that transmits image data based on the printer information 606 received in step S1511.

In step S1513, the CPU 111 of the MFP 10 performs processing for printing the received image data. The CPU 111 may also receive print settings together with image data from the message application server 30. In that case, the print settings are set on the message application server 30 by the user via the user terminal 20.

The above-described configuration enables the message application server 30 to transmit the image data received from the user terminal 20 to the MFP 10 to request the MFP 10 to perform print control.

The configuration according to the present exemplary embodiment is merely an example, and the present disclosure is not limited to the illustrated configuration. For example, the control access token 1402 illustrated in steps S1501 to S1507 may be stored in the message application server 30 or the user terminal 20, so that it is possible to omit the authentication operation each time.

While, in the present exemplary embodiment, the authentication information is input from the user terminal 20, as in step S1208, the authentication information may be input from the MFP 10. In this case, the tenant registration button 1311 is pressed on the operation unit 116 of the MFP 10 in step S1201, and the user code and the URI are displayed on the operation unit 116 in step S1205. In addition, the user code is input from the operation unit 116.

When the authentication information is input from the user terminal 20, the authentication information is stored in the storage 114. Upon completion of the registration of the MFP 10 to the tenant server 40, the user terminal 20 transmits a request for installing the cooperative application 506 and the stored authentication information to the message application server 30 without receiving the control access token 1402. The message application server 30 transmits the received authentication information and a request for permitting the installation of the cooperative application 506 in the message application server 30 to the tenant server 40. The subsequent processing is similar to the processing in steps S1223 to S1235.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure includes exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-026676, filed Feb. 22, 2021, which is hereby incorporated by reference herein in its entirety.

What is claimed is:

1. An information processing system comprising:
an image processing apparatus;
a first information processing apparatus; and
a second information processing apparatus configured to manage a chat service, the second information processing apparatus transmitting print data based on a message posted in the chat service to the image processing apparatus registered in the first information processing apparatus upon execution of a predetermined application,
wherein the first information processing apparatus comprises:
a first controller,
wherein the first controller receives an instruction for registering the image processing apparatus in the first information processing apparatus,
wherein the first controller receives, based on reception of the instruction, first authentication information input by a user,
wherein the first controller performs authentication based on the first authentication information received by the first controller, and
wherein, based on the authentication by the first controller, the first controller performs registration of the image processing apparatus to which the print data is to be transmitted by the execution of the predetermined application; and
a first network interface,
wherein the first network interface transmits second authentication information to the image processing apparatus, the transmission of the second authentication information being triggered by the registration of the image processing apparatus by the first controller,
wherein the image processing apparatus comprises:
a second network interface,
wherein the second network interface receives the second authentication information from the first information processing apparatus, and
wherein the second network interface transmits to the first information processing apparatus an installation request of the predetermined application for printing the print data posted in the chat service and the second authentication information without receiving, after the registration of the image processing apparatus by the first controller, an instruction for installing the predetermined application in the second information processing apparatus, the transmission of the installation request and the second authentication information being triggered by the reception of the second authentication information from the first information processing apparatus, and
wherein the first network interface receives the installation request and the second authentication information from the image processing apparatus, and
wherein the first controller performs authentication for installing the predetermined application in the second information processing apparatus based on the second authentication information received by the first network interface and then the first controller causes the second information processing apparatus to install the predetermined application.

2. The information processing system according to claim 1, wherein the first controller receives the first authentication information input on a terminal apparatus by the user.

3. The information processing system according to claim 1, wherein the message includes first information indicating a file name of the print data and second information indicating the image processing apparatus, and
wherein the second information processing apparatus specifies, based on the second information, a transmission destination of the print data.

4. The information processing system according to claim 1, wherein the first controller determines whether to permit installation of the predetermined application in the second information processing apparatus based on the authentication.

5. The information processing system according to claim 4,
wherein, when the first controller determines to permit the installation of the predetermined application in the second information processing apparatus, the first information processing apparatus transmits predetermined information to the second information processing apparatus, and
wherein, upon reception of the predetermined information from the first information processing apparatus, the second information processing apparatus installs the predetermined application.

6. The information processing system according to claim 1, wherein, when the second network interface receives the second authentication information, the second network interface transmits the second authentication information and identification information for the predetermined application.

7. The information processing system according to claim 6, wherein the identification information for the predetermined application is stored in the image processing apparatus.

8. The information processing system according to claim 6, wherein, based on the identification information for the predetermined application, the second information processing apparatus receives the predetermined application from an external apparatus and installs the predetermined application.

9. The information processing system according to claim 1, wherein the second information processing apparatus interprets the posted message and transmits the print data to the image processing apparatus based on the interpreted message.

10. A method for controlling an information processing system including an image processing apparatus, a first information processing apparatus, and a second information processing apparatus configured to manage a chat service, the second information processing apparatus transmitting print data based on a message posted in the chat service to the image processing apparatus registered in the first information processing apparatus upon execution of a predetermined application, the method comprising:
accepting an instruction for registering the image processing apparatus in the first information processing apparatus;
first receiving, based on reception of the instruction, first authentication information input by a user;

first performing authentication based on the first authentication information received in the first receiving;

performing, based on the authentication in the first performing, registration of the image processing apparatus to which the print data is to be transmitted by the execution of the predetermined application;

second transmitting second authentication information to the image processing apparatus, the transmission of the second authentication information being triggered by the registration of the image processing apparatus in the registering;

second receiving the second authentication information from the first information processing apparatus;

third transmitting to the first information processing apparatus an installation request of the predetermined application for printing the print data posted in the chat service and the second authentication information without receiving, after the registration of the image processing apparatus, an instruction for installing the predetermined application in the second information processing apparatus, the transmission of the installation request and the second authentication information being triggered by the reception of the second authentication information in the second receiving;

third receiving the installation request and the second authentication information from the image processing apparatus; and second performing authentication for installing the predetermined application in the second information processing apparatus based on the second authentication information received in the third receiving and then causing the second information processing apparatus to install the predetermined application.

* * * * *